W. G. CHIPLEY.
TIRE.
APPLICATION FILED AUG. 31, 1912.

1,080,416.

Patented Dec. 2, 1913.

UNITED STATES PATENT OFFICE.

WILLIAM G. CHIPLEY, OF ATLANTA, GEORGIA, ASSIGNOR TO PNEUMATIC RIM & TIRE COMPANY, OF WILMINGTON, DELAWARE, A CORPORATION OF DELAWARE.

TIRE.

1,080,416.   Specification of Letters Patent.   Patented Dec. 2, 1913.

Application filed August 31, 1912. Serial No. 718,120.

*To all whom it may concern:*

Be it known that I, WILLIAM G. CHIPLEY, a citizen of the United States, residing at Atlanta, in the county of Fulton and State of Georgia, have invented certain new and useful Improvements in Tires; and I do hereby declare the following to be a full, clear, and exact description of the invention, such as will enable others skilled in the art to which it appertains to make and use the same.

This invention relates to tires, and the object is to provide a tire especially adapted to take up shocks due to an uneven roadway. A further object is to provide a plurality of resilient tire members so connected that any independent rolling or creeping tendency imparted to the outer portion of the tire shall be effectually taken up by the intermediate neck portion without being transferred, except to a comparatively slight degree, to the inner member of the tire.

A still further object is to provide a tire comprising two metallic rims separated from each other by a plurality of air tubes, the circumference of one tube being in contact with that of the other, and the upper portion of the outer rim constituting a truss member from which the tire is suspended.

With these and other objects in view, the invention consists in the novel construction hereinafter described.

Figure 1:
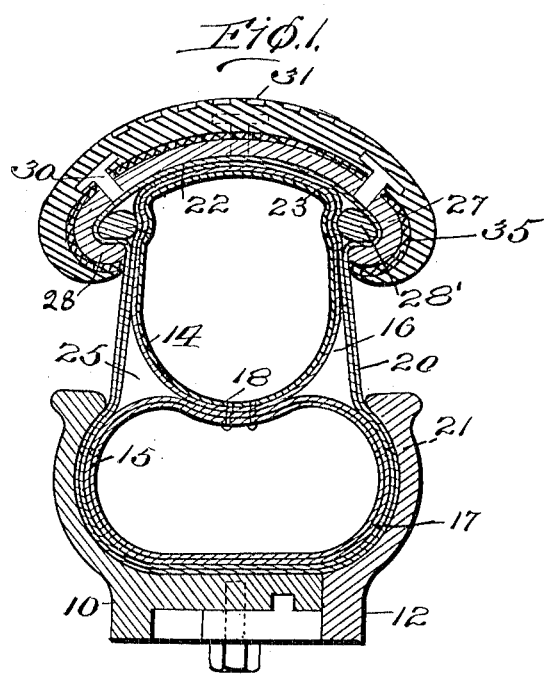
Figure 2:
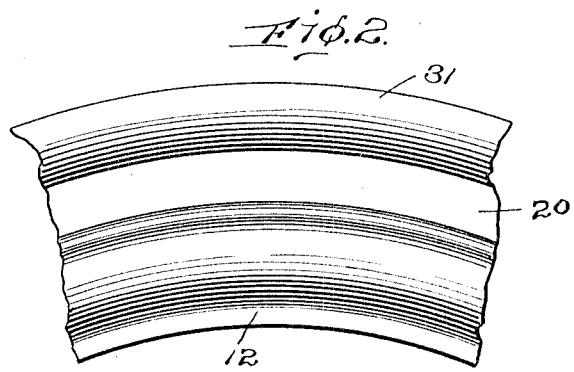

In the accompanying drawings forming a part of this application, Figure 1 is a transverse section of the tire as applied to the rim. Fig. 2 is a fragmentary view in side elevation.

Referring especially to Fig. 1, the parts of the rim are indicated by 10 and 12, these parts being suitably secured together and providing for the reception of the inner portion of the tire. The tire is composed of two main portions each comprising an inner and an outer tube. The inner tube of the outer portion of the tire is indicated by 14, and the inner tube of the other of said portions of the tire by 15. A covering 16 is provided for tube 14 and a corresponding cover 17 for tube 15. The covers and tubes may have the configuration shown in Fig. 1, the inner portion of the tire, including the tube and cover, having a somewhat flattened form as compared with the outer portion thereof. Tube 14 and cover 16 contact with the adjacent tube and cover at the central portion thereof, the line of contact extending circumferentially of said inner cover and tube. Stitching 18 serves to secure the parts together at the aforesaid central portion. A reinforcing fabric 20 is connected with the cover 17 by stitching approximately at the point 21 on each side of the tire and rim, and is connected with the covering 16 at approximately the points 22 and 23. Between the reinforcing member 20 and the adjacent tubes an air space 25 is provided on each side, containing air at atmospheric pressure, this air space serving to provide an additional cushioning effect and constituting an important feature of the present construction.

An outer metallic rim 27 is formed as shown in Fig. 1, and has inwardly turned flanges 28 which engage portions of the cover 16 and hold the parts in the position illustrated. In order to form a shoulder member which may positively engage flanges 28, I include between the layers of fabric 20, or attach to said layers or to the tube covering 16, a strip of leather or other material 28'. Rivets 30 are inserted at suitable distances in the metallic rim 27, and an outer rim 31 of rubber is vulcanized to the structure thus presented and forms the tread of the completed tire. The edges of rim 31 may extend completely around the metallic rim 27, and to the edges of the flanges thereof, as shown in Fig. 1. A layer of asbestos 35 is located between the metallic rim and the tread, for the purpose of preventing the transmission of heat.

Especial attention is directed to the feature of tire suspension, previously mentioned, which is made possible by the employment of the outer metallic rim in the manner set forth, by means of which such suspension may be effected. This rim may have such degree of resiliency as is found desirable. Further attention is directed to the inner tube 15 and cover 17, as compared with the rim 12, the upper portion of this part of the tire being substantially on a line with the edges of the rim and providing a slight depression for the tube 14 and cover 16, if desired. This method of attaching the parts permits the outer portion of the tire to roll to a slight degree with reference to the inner portion and take up sidewise or other displacement of the outer portion, due to skidding or other causes.

The air spaces 25, located as shown with reference to the tubes and the edges of rim 12, greatly assist in attaining the results sought in the employment of this type of construction. The air here is at atmospheric pressure and the outer wall of the chamber 25 may be somewhat loose in order that there may be a tendency to absorb strains or shocks without transmitting them to the tube.

It will be understood that the tube covers are provided with the usual openings for the insertion of the tubes.

What I claim as new and desire to secure by Letters Patent is:

1. In a device of the class described, a tire comprising an outer portion and an inner portion each of which is inflatable, one portion being mounted on the other, and a flexible device for forming an air chamber between the two portions, the flexible device being arranged for disposition approximately opposite the edges of a tire holding device.

2. In a device of the class described, a tire comprising an outer portion and an inner portion each of which is independently inflatable, one portion being mounted on the other, connecting means for the contacting portions, a flexible device secured to each of said portions and defining an air space between the portions and the device last mentioned, a metallic rim for the outer tire portion, and a tread connected with the rim.

3. In a device of the class described, a tire comprising a plurality of portions independently compressible, flexible means defining with the outer surface of such portions, an annular air chamber on each side of the tire and a rim connected with the outer portion.

4. In a device of the class described, a tire comprising a plurality of portions which are independently compressible, an inner rigid rim for supporting one of said portions, an outer rim carried by the other of said portions and flexible means for defining an air chamber independent of the tire members proper, said outer rim constituting a truss member for portions of the tire, and means supported by other portions thereof.

5. In a device of the class described, a tire comprising a plurality of portions which are independently compressible, a rim for supporting one of said portions, flexible means for forming annular air chambers adjacent to the line of contact of said portions and substantially on a line with the edges of the rim, and an outer rim carried by one of said tire portions.

In testimony whereof I affix my signature in presence of two witnesses.

WILLIAM G. CHIPLEY.

Witnesses:
THEODORE F. KUPER,
LUCY T. BURNS.

Copies of this patent may be obtained for five cents each, by addressing the "Commissioner of Patents, Washington, D. C."